(12) United States Patent
Robin et al.

(10) Patent No.: US 7,822,314 B1
(45) Date of Patent: Oct. 26, 2010

(54) SEGMENTED ACOUSTIC CORE PHOTONIC CRYSTAL FIBER LASER

(75) Inventors: Craig A. Robin, Albuquerque, NM (US); Thomas M. Shay, Albuquerque, NM (US); Iyad A. Dajani, Alburquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 212 days.

(21) Appl. No.: 12/166,611

(22) Filed: Jul. 2, 2008

(51) Int. Cl.
*G02B 6/00* (2006.01)
*H01S 3/00* (2006.01)
*H04B 10/12* (2006.01)

(52) U.S. Cl. .............. 385/142; 385/122; 359/334; 359/341.1; 359/341.5

(58) Field of Classification Search .............. 385/142; 359/334, 341.1, 341.5
See application file for complete search history.

(56) References Cited

U.S. PATENT DOCUMENTS

| | | | |
|---|---|---|---|
| 5,851,259 A | 12/1998 | Clayton | |
| 6,542,683 B1 | 4/2003 | Evans | |
| 6,587,623 B1 | 7/2003 | Papen | |
| 6,856,740 B2 | 2/2005 | Balestra | |
| 7,228,039 B2 * | 6/2007 | Bickham et al. | 385/123 |
| 7,463,807 B2 * | 12/2008 | Dragic | 385/127 |
| 7,558,461 B2 * | 7/2009 | Chen et al. | 385/142 |
| 7,627,219 B2 * | 12/2009 | DiGiovanni et al. | 385/124 |
| 2007/0019283 A1 * | 1/2007 | Mermelstein et al. | 359/334 |
| 2007/0116416 A1 * | 5/2007 | Chen et al. | 385/123 |

OTHER PUBLICATIONS

Yoh Imai and Noriaki Shimada, IEEE Photon. Technol. Lett. 16, pp. 1335-1337, Nov. 11, 1993.
Jeong et al. in IEEE J. of Selected Topics in Quantum Electron., pp. 546-551, May/Jun. 2007.
Wang et al., Proc. of SPIE, 6351, 635109 pp. 1-7, 2006.
Shiraki et al., J. Lightwave Technol., vol. 14, pp. 50-57, Jan. 1, 1996.

* cited by examiner

*Primary Examiner*—Uyen-Chau N Le
*Assistant Examiner*—John M Bedtelyon
(74) *Attorney, Agent, or Firm*—Kenneth E. Callahan

(57) ABSTRACT

Stimulated Brillouin scattering (SBS) in a photonic crystal fiber is suppressed by doping the individual core segments such that the Brillouin frequency of each segment is sufficiently different from the neighboring segments that Brillouin scattered light from one core segment sees negligible gain from the other core segments, whereby higher power narrow-linewidth optical fiber amplifiers and lasers may be obtained. The optical properties of the guiding medium are preserved through the careful design of the core and the lattice structure.

3 Claims, 4 Drawing Sheets

SEGMENTED ACOUSTIC CORE PHOTONIC CRYSTAL FIBER LASER

STATEMENT OF GOVERNMENT INTEREST

The conditions under which this invention was made are such as to entitle the Government of the United States under paragraph I(a) of Executive Order 10096, as represented by the Secretary of the Air Force, to the entire right, title and interest therein, including foreign rights.

BACKGROUND OF THE INVENTION

The present invention relates generally to optical fibers and amplifiers, and in particular to narrow-linewidth high-power continuous wave (CW) or quasi-continuous fiber lasers and amplifiers.

Stimulated Brillouin scattering (SBS) is a limiting factor in the evolution of fiber lasers and amplifiers towards higher power. It is also harmful to optical communications signals. Extensive work has been done to mitigate this phenomenon since it was first observed in optical fibers in 1972. A quantum mechanical approach indicates that light quanta (photons) are scattered by acoustic medium excitations (phonons) which are generated through the process of electrostriction. This creates scattered photons at the so-called Stokes frequency. From a semi-classical viewpoint, a nonlinear interaction occurs between the laser and Stokes optical fields through an acoustic wave. It is well-known in the art that once a certain amount of optical power is coupled into or is generated in the fiber, the backscattered Stokes light causes the performance of the fiber to degrade.

The SBS process is characterized by a gain spectrum that determines the SBS response of the medium to the pump frequency. Measurements in silica fibers have established a Brillouin shift of approximately 16 GHz and a linewidth, $\Delta v_B$, of approximately 40 MHz at a wavelength of 1064 nm. For laser pulses of width smaller than the phonon lifetime, the SBS process is insignificant as compared to another nonlinear process called stimulated Raman scattering (SRS). Even for continuous wave (CW) pumping, the Brillouin gain is reduced considerably if the linewidth of the pump is greater than $\Delta v_B$. However, some applications including directed energy applications require the use of high power narrow linewidth optical fiber amplifiers and lasers and the mitigation of SBS effects will be necessary for the development of kilowatt level devices.

The SBS threshold can be increased by decreasing the effective length of the fiber, increasing the effective area, or somehow manipulating the Brillouin gain in the fiber. The increase in the SBS threshold through the decrease of length is limited by the gain requirements in the fiber. Increased gain per unit length through higher concentrations of rare earth elements is beset with problems associated with a process known as photo-darkening and also by solubility limits. Much work has been done to increase the effective area of the fiber through the use of large mode area (LMA) fibers. While to conventional LMA fiber designs have been successfully pushing the power output of laser amplifiers beyond 100 watts, there is general agreement that new approaches are required for further enhancement of the power output.

A variety of experimental efforts have been attempted or proposed to reduce the SBS threshold through the manipulation of the fiber optical or acoustical properties as related to the overall SBS gain. In U.S. Pat. No. 5,851,259 by Clayton et al., the SBS threshold is reduced by introducing a modulation in the tension applied to the fiber during the draw process. This idea was expanded on in U.S. Pat. No. 6,542,683 by Evans et al. as a permanent, non-uniform stress is imparted to the fiber core through non-uniform thermal expansion and viscosity profiles. The latter inventor shows that a simple modulation of tension during the draw process leads to a marginal increase in the SBS threshold. The technique is limited by the fact that a change in the draw tension leads to a change in the fiber diameter. The latter inventor did not envision a fiber which could be manufactured with polarization maintaining properties.

Thermal frequency shift through a thermal gradient in the fiber is also possible. This frequency shift was measured by Imai et al. to be of the order of a several MHz per degree Kelvin as reported in a 1993 paper in IEEE Photon. Technol. Lett. 16, pp. 133-1337. Along these lines, in the 2007 paper by Jeong et al. in IEEE J. of Selected Topics in Quantum Electron., pp. 546-551, thermal broadening by quantum-defect heating increased the SBS threshold sufficiently high that an approximately 400 Watt polarization maintaining narrow linewidth single mode output was obtained.

In U.S. Pat. Nos. 6,587,623 by Papen et al. and 6,856,740 by Balestra et al. designs that guide the optical signal in the core of the fiber while at the same time guiding the acoustic wave in the cladding are proposed. In the 2006 paper by Wang et al., Proc. of SPIE, 6351, 635109 pp. 1-7, a reduction in the overlap between the optical and acoustic fields is achieved through the fabrication of an aluminum/germanium countergraded fiber-core composition profile. The result of this design is a continuous change of the acoustic velocity in the fiber core in the radial direction. Unfortunately this technique requires a large acoustic index of refraction gradient which is difficult to implement. Furthermore, it is still unclear whether this technique can be implemented in conjunction with a longitudinal thermal gradient None of the ideas outlined above have, however, shown great promise in mitigating the SBS effect sufficiently enough so that multi-kilowatt level narrow linewidth fiber lasers and amplifiers can be built. Accordingly, there remains a need for novel techniques for mitigating the SBS effect.

SUMMARY OF THE INVENTION

The approach for mitigating Stimulated Brillouin Scattering in optical fiber waveguides of the present invention is a novel technique that takes advantage of the unique structure of the core in a Photonic Crystal Fiber (PCF) and conventional optical fiber using the stack and draw fabrication method. When a stack and draw technique is used to fabricate the core of an optical fiber waveguide, the core is comprised of smaller rods each having similar optical properties, such that the arrangement of the rods creates the desired core geometry. As an example, conventional PCF's have a core comprised of 7 rods arranged in a hexagonal pack which are surrounded by a periodic structure of air holes.

In the present invention a PCF core was designed such that each of the core segments has a Brillouin frequency $v_B$ sufficiently different from the neighboring segments that Brillouin scattered Stokes light from one core segment sees negligible gain from the other core segments. This Brillouin frequency shift is achieved by introducing dopants into each of the core constituent rods such that their optical properties remain the same, but their acoustic resonance frequency is shifted. This technique, referred to as Segmented Acoustic Core, can potentially provide a factor of N increase in the SBS threshold for an N segment composite core.

DESCRIPTION OF THE PREFERRED EMBODIMENT

The present invention is a method for reducing the stimulated Brillouin scattering (SBS) effect in order to allow for the design of high power fiber lasers and amplifiers. The invention is applicable to various waveguide structures comprised of core and cladding regions in which most of the light power is contained in the core. The following discussion primarily addresses photonic crystal fibers, but those practicing this art can make use of it for broader applications for waveguide structures with single and multi-clad waveguide structures.

As an overview, a photonic crystal fiber amplifier consists of a silica core doped with a rare earth element such as erbium (Er) of ytterbium (Yb). The purpose of the rare earth dopant is to provide laser gain. Confinement in the core is assured by surrounding the core with a cladding consisting of microstructures which are typically air holes that run parallel to the fiber axis. In the art, it is recognized that such a design structure can lead to the propagation of a single light mode in a fairly large core without the need for stringent coiling requirement imposed on other guiding configurations. A double clad design which is highly beneficial for efficient amplifier operation can be attained through the introduction of a second cladding layer consisting of a web of sub-wavelength silica bridges.

Figure 1:
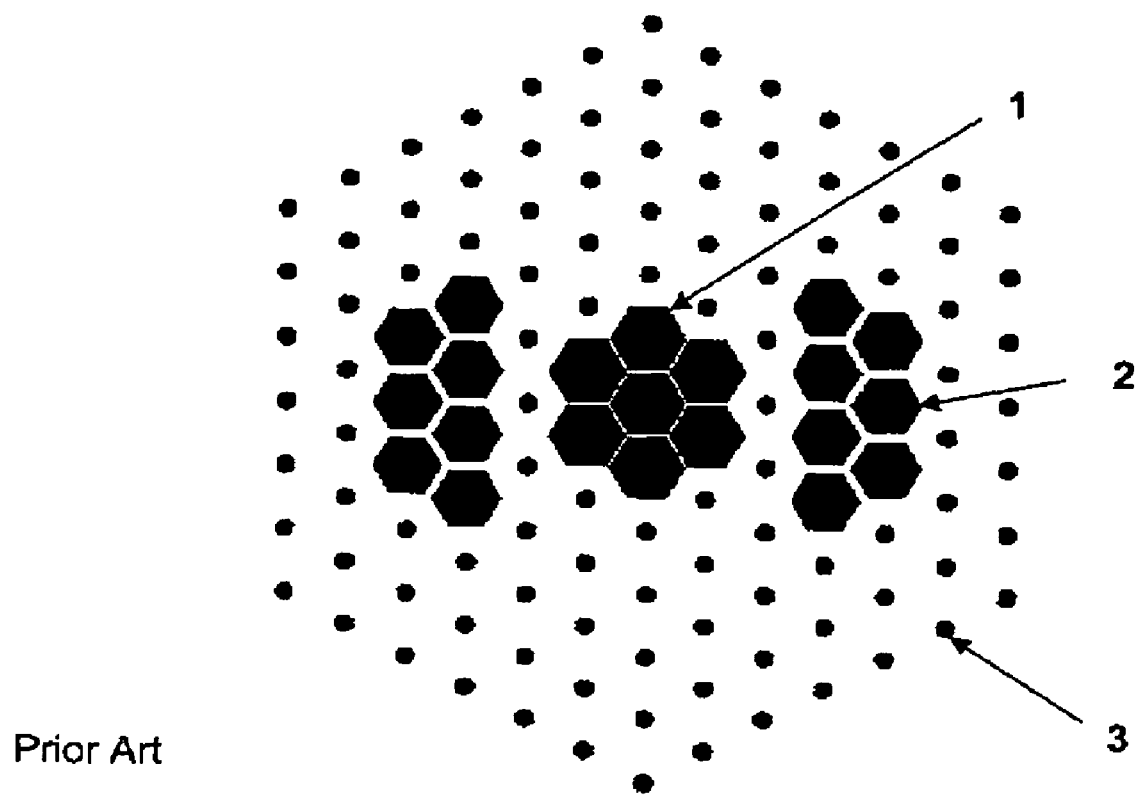
FIG. 1 is a schematic diagram of the core of a photonic crystal fiber (PCF). The seven hexagons 1 at the center make up the core of the PCF and are doped with a rare-earth element. The outer hexagons 2 are the stress inducing elements making the fiber polarization maintaining. The black dots 3 represent the air holes used to create the effective index of refraction in the cladding used for waveguiding.

Referring to the drawings, a photonic crystal fiber (PCF) core typically consists of 7 doped hexagonal rods 1 that are surrounded by a photonic crystal lattice as shown in FIG. 1. This configuration can be attained through a process known in the art as the stack and draw. During this process, seven separate performs or core rods are prepared and are then stacked in a hexagonal pattern. The stack is then fed into a drawing tower to achieve the desired dimensions of a PCF fiber. The segments are doped uniformly so that the optical index of refraction is the same in all segments. The optical index of refraction of the core is a measure of how fast light travels inside a medium. Cores consisting of more than 7 segments are also possible. For example, the next higher PCF core design would consists of 19 segments.

Because of the uniform doping of the segments, the acoustic index of refraction is also preserved throughout the core. The acoustic index of refraction determines both is the speed that sound travels in the core and the SBS gain of the core. As a result of the uniform doping, different core segments excite exactly the same SBS wave. In order for the different segments in the fiber to have different acoustic responses, the acoustic indices of refraction of the segments need to be manipulated. The outer hexagons 2 in FIG. 1 are the stress inducing elements making the fiber polarization maintaining. The black dots 3 represent the air holes used to create the effective index of refraction in the cladding used for waveguiding.

Figure 2:
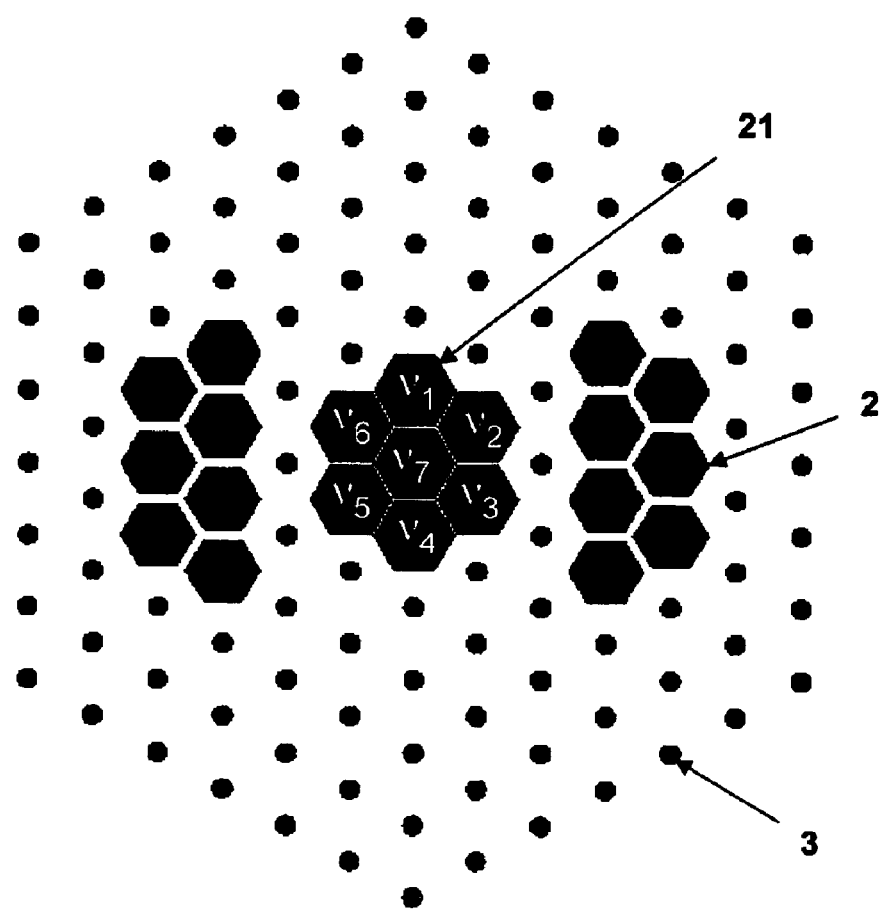
FIG. 2 is a diagram of the core structure in a segmented acoustic core design. The to acoustic frequency in each segment is different.

FIG. 2 is an illustration of the present invention whereby different SBS frequencies $v_i$ are excited in different core segments 21 of the fiber. The outer hexagons 2 are again the stress inducing elements making the fiber polarization maintaining and the black dots 3 represent the air holes used to create the effective index of refraction in the cladding used for waveguiding. It is known from the scientific literature that different dopant concentration levels can change both the optical and acoustic indices of refraction of a medium. The work of Shiraki et al. as reported in 1996 in J. Lightwave Technol., Volume 14, pp. 50-57 provides strong evidence of this phenomenon. The types of dopants used are different from the rare earth elements used to achieve laser gain and include germanium, aluminum, fluorine, and phosphorous. Germanium, for example, is known to raise both the optical and acoustic indices of refraction of glass. Fluorine, on the other hand, decreases the optical index of refraction while increasing the acoustic index of refraction of glass. Therefore depending on the type and concentration level of the dopants, it is possible to increase or decrease both indices of refraction at the same time, increase one while decreasing the other, or keeping one or both unchanged.

For fiber amplifiers, it is important to maintain beam quality through single mode operation of the fiber. This is intimately related to the optical index of refraction of the core. Thus in manipulating the acoustic indices of refraction of the PCF core segments, it is crucial that the optical indices of refraction of the segments are kept approximately equal. Through the proper choice of dopants and concentration levels, it is possible as stated above to change the acoustic properties among the different core segments while keeping the optical properties intact.

Figure 3:
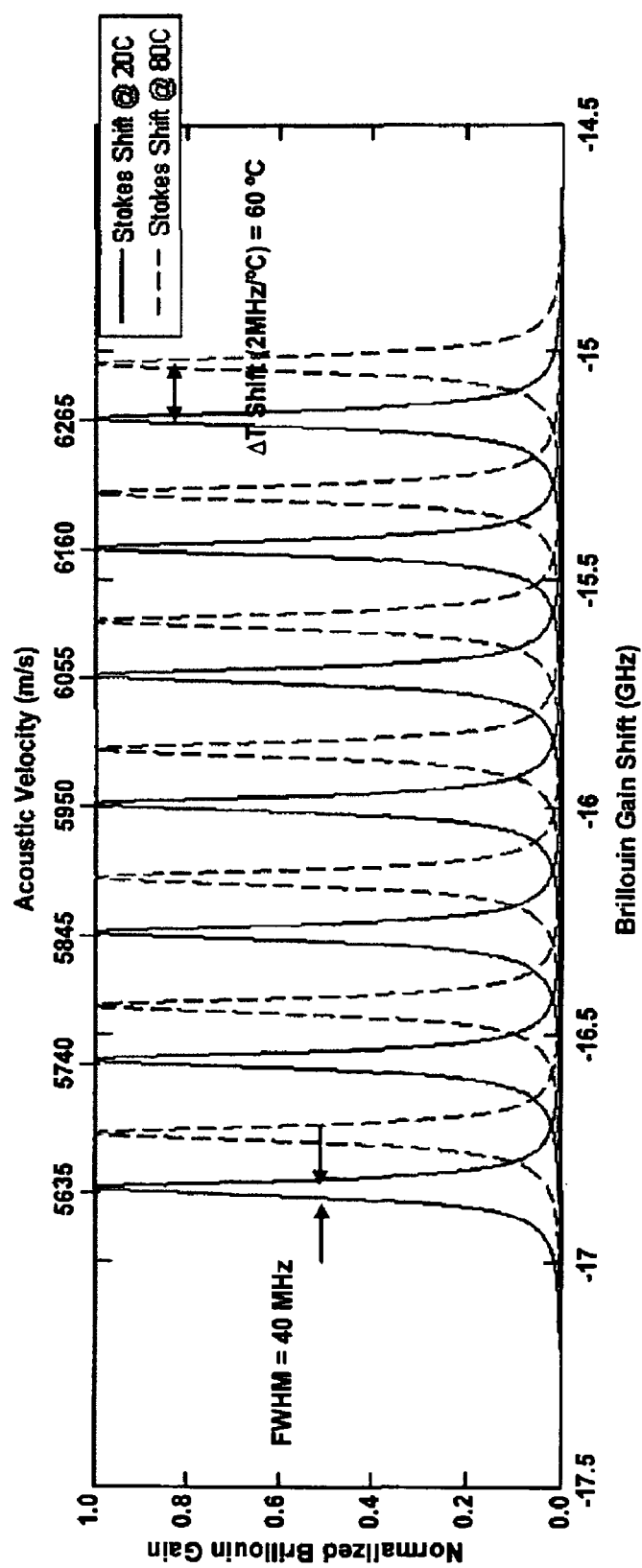
FIG. 3 is a representation of the SBS frequency response of the various segments in a PCF core. The SBS frequency response in the segments when a longitudinal temperature gradient is present is also shown.
Figure 4:
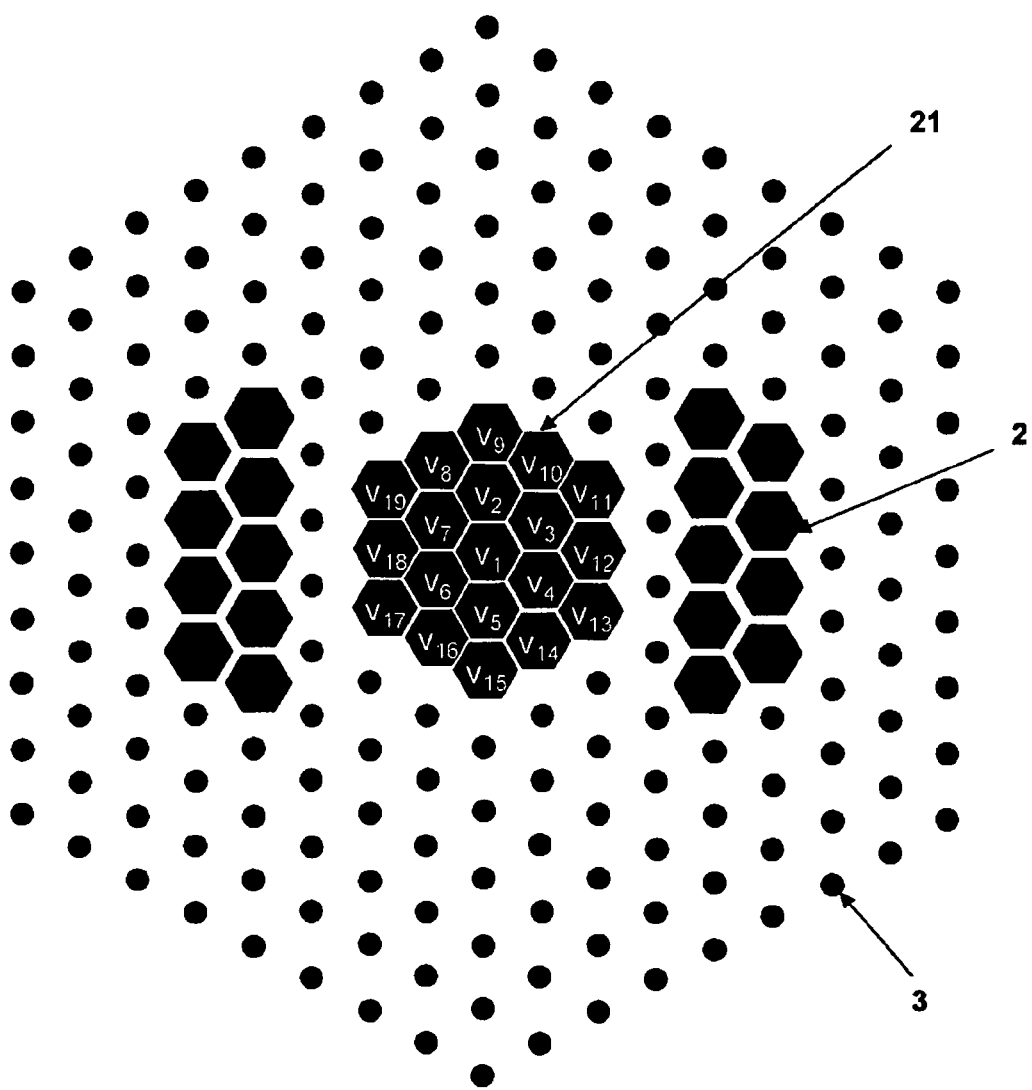
FIG. 4 is a schematic diagram of the core of a PCF comprised of 19 segments.

FIG. 3 shows the SBS frequency response that can be induced in a 7-segment PCF core. The total Brillouin shift is approximately 1.5 GHz and can be introduced by varying the concentration levels of the dopants in the range of a few percent. This is sufficient to accommodate at least seven distinct peak Brillouin frequencies without any linewidth overlap. This means that the minimum difference between the SBS frequencies, $v_{B,i}$'s greater than twice the Brillouin linewidth $2\Delta v_B$. Any Stokes light with a frequency lying outside the range that corresponds to the linewidth will see little SBS gain from that particular segment. Stokes light generated in each segment will diffract at first and is then guided through the fiber. Thus, Stokes light generated in a particular segment is spread throughout the 7 segments. This will effectively raise the SBS threshold for the fiber amplifier allowing the fiber to be pumped with higher pump powers. FIG. 3 also illustrates that this concept can also be used in conjunction with a longitudinal thermal gradient.

The following discussion is restricted to the undepleted pump approximation in a passive fiber although the invention can also be implemented in an active fiber. The SBS results from the parametric coupling between light and acoustic waves. The acoustic wave is driven by an electrostrictive force caused by the interaction of the signal light and its Stokes light which travels in the backward direction. The acoustic wave oscillates at a frequency equal to the difference between the signal and the Stokes waves. The principle of momentum conservation then dictates that the wave number of the acoustic wave is approximately twice the wave number of the signal light. As a result of this parametric interaction and the relations among the frequencies and wave numbers, the SBS process is what is called phase-matched. This means that the Stokes light will grow steadily as it propagates in a backward direction in the fiber. The Stokes light at steady state can be expressed as:

$$E_{SBS}(\vec{r}, t) = \frac{1}{2}\sum_i f_i(\vec{r})\exp[i(\beta_i z + \omega_i t)] + c.c., \qquad \text{Eq. (1)}$$

where $\beta_i$ and $\omega_i$ refer to the propagation constant and frequency of the Stokes light that is being generated in an individual segment of the core as shown in FIG. 2. Assuming that the Brillouin gain spectrum of the segments do not overlap, the spatial evolution of $f_i$ satisfies the equation $$\vec{\nabla}_\perp^2 f_i + 2i\beta_i \frac{\partial f_i}{\partial z} - \frac{\omega_i^2}{c^2}(\beta_i^2 - n_i^2)f_i = -i\beta_i g_{SBS}^i I_s f_i, \qquad \text{Eq. (2)}$$

where $g_{SBS}^i$ represents the Brillouin gain for segment i, $I_s$ is the intensity of the laser signal, and where $n_i$ is the optical index of refraction at $\omega_i$. This equation can be solved using coupled mode theory. The spatial amplitude of the Stokes wave and the laser intensity in the lowest order modal profile are expressed as:

$$f_i(\vec{r}) = A_i(z)\psi(x,y) \qquad \text{Eq. (3)}$$

$$I_s = I_{s,0}|\psi|^2 \qquad \text{Eq. (4)}$$

where $\psi$ is the lowest order optical modal profile and $I_{s,0}$ is a constant. Note that the same modal profile was used for all Stokes light as well as the laser signal as the variation of the optical index of refraction over a range of an SBS frequency shift is negligible. The evolution of $A_i$ along the length of the fiber is then described by $$\frac{dA_i}{dz} = -\frac{I_{s,0}A_i}{2} \frac{\int\int g_{SBS}^i |\psi|^4 dx dy}{\int_{-\infty}^{\infty}\int_{-\infty}^{\infty}|\psi|^2 dx dy}. \qquad \text{Eq. (5)}$$

Since the Stokes light is propagates in the opposite direction, the solution of this equation is given by:

$$A_{s,i}(0) = A_{s,i}(L)\exp\left(\frac{I_s L}{2} \frac{\int\int g_{SBS}^i |\psi|^4 dx dy}{\int_{-\infty}^{\infty}\int_{-\infty}^{\infty}|\psi|^2 dx dy}\right). \qquad \text{Eq. (6)}$$

As discussed above, if the Stokes light frequencies are sufficiently separated, the Stokes generated in segment i sees little gain from the other segments. Therefore, the to overlap integral in the numerator of the equation above is carried across the dimensions of segment i. If the optical modes have a flattened modal profile, the above expression will indicate a seven fold increase in the SBS threshold of the 7 segment core. In general, if the core is made up of N segments possessing sufficiently separated SBS response frequencies, the SBS threshold will be given by:

$$P_{th,eff} \approx P_{th} \cdot N$$

Here $P_{th}$ represents the SBS threshold power in a homogeneously doped core structure, and N is the number of segments in the core. As a result, the SBS threshold is raised by a factor of approximately N.

As mentioned above, a significant advantage of our invention is that it can be used in conjunction with other SBS suppressing techniques. One such technique makes use of the thermal gradient induced in fiber amplifier along the length of the fiber. FIG. 3 shows a plot of the frequency response of a 7 segments core as the temperature is varied by as much as 60 degrees. Note that there is still little overlap among the 14 SBS gain frequencies which will indicate that the techniques can be used in conjunction.

Example 1

A Photonic Crystal Fiber with a Core Modal Field Diameter of 30 Microns

The cladding in this example is approximately 250 microns and is made of inner and outer cladding regions. The core is made of 7 segments doped uniformly with ytterbium. Each segment of the core is doped with different concentrations of germanium and fluorine such that the optical index of refraction is the same in all segments but the acoustic index is not. The modal profile is flattened through the manipulation of the microstructures in the cladding region. The fiber is cladding pumped using 975 nm light. The seed light is at 1064 nm. Gain is achieved at 1064 nm and the SBS threshold is mitigated to seven times the power of a similar fiber but with uniform doping. The SBS threshold will also be much higher than that of conventional LMAs as the underlying physics describing both fiber structures is similar.

Example 2

A Photonic Crystal Fiber with a Core Modal Field Diameter of 40 Microns

The cladding is approximately 250 microns and is made of inner and outer cladding regions. The core is made of 19 segments doped uniformly with ytterbium. Each segment of the core is doped with different concentrations of germanium and aluminum such that the optical index of refraction is the same in all segments but the acoustic index is not. The fiber is cladding pumped using 975 nm light. The seed light is at 1064 nm. Gain is achieved at 1064 nm and the SBS threshold is mitigated to much higher power. Note that in both these examples any combination of dopants that produces a closely matched optical index of refraction and a significantly different index of refraction for each segment will increase the SBS threshold.

The dopant species and concentration required to vary the acoustic index in each core segment while keeping the optical index of refraction the same for each segment is well known to those skilled in the art.

The invention claimed is:
1. In a standard photonic crystal fiber comprised in cross-section of N uniformly doped, hexagon-shaped silica core segments enclosed by a cladding comprised of stress applying parts and air holes, the improvement comprising adding a plurality of non-rare earth dopants known to either raise or lower the acoustic index of refraction or the optical index of refraction or both to said N core segments selected in type and concentration such that the acoustic index of refraction of each core segment is changed to support N distinctly different peak Brillouin frequencies having no linewidth overlap while maintaining the same optical index of refraction for all N core segments, thereby enabling kilowatt-level narrow-linewidth fiber lasers and amplifiers.

2. The photonic crystal fiber improvement of claim 1, wherein said plurality of additional non-rare earth dopants includes two or more dopants selected from germanium, aluminum, fluorine, and phosphorous.

3. The photonic crystal fiber improvement of claim 1, wherein said claim 1 improvement is combined with a longitudinal thermal gradient to thereby further increase the stimulated Brillouin scattering threshold.

* * * * *